Nov. 19, 1940.  A. SCHEIBE  2,222,457

VALVE GUIDE ARRANGEMENT

Filed Oct. 15, 1938  2 Sheets-Sheet 1

Inventor:
Alfred Scheibe
by
Attorney.

Nov. 19, 1940.  A. SCHEIBE  2,222,457
VALVE GUIDE ARRANGEMENT
Filed Oct. 15, 1938  2 Sheets-Sheet 2

Inventor:
Alfred Scheibe
Gerault Baldwin
Attorney.

Patented Nov. 19, 1940

2,222,457

UNITED STATES PATENT OFFICE 2,222,457

VALVE GUIDE ARRANGEMENT

Alfred Scheibe, Dessau, Germany, assignor to Junkers Flugzeug-und-Motorenwerke Aktiengesellschaft, Dessau, Germany, a corporation of Germany Application October 15, 1938, Serial No. 235,137

5 Claims. (Cl. 123—188)

This invention relates to improvements in valve guide arrangements, and refers particularly to valve guide arrangements for water cooled motors.

In the case of motors for use on airplanes it is very necessary to reduce the weight to a minimum, and in consequence motors are often made of a light alloy metal which is relatively soft and whose wearing qualities are such as to not successfully withstand the constant reciprocation of valve spindles therethrough at high speed unless the said spindles are of relatively larger diameter. However in high speed motors it is very necessary to reduce the size and weight of the valves and spindles to a minimum, to obtain efficient operation. It is therefore very desirable to provide quite small valve guides having high heat radiating qualities which cannot satisfactorily be made of light alloy metals.

It is an object of the invention to provide a valve guide arrangement including a readily inserted bushing which has high heat radiating qualities, and which may be satisfactorily employed to guide a valve stem of relatively small cross section at high speed without fear of the stem or bushing becoming distorted by the heat of the motor.

Another object of the invention is to provide a valve guide arrangement wherein an inserted bushing extends from the valve chamber through the outer wall of the cooling chamber and passes directly through the said cooling chamber in contact with the cooling medium therein, so that maximum cooling of the bushing and the valve stem passing therethrough may be obtained.

A further object of the invention is to provide a valve guide arrangement including an inserted bushing wherein means are provided for preventing leakage either into the valve chamber or to the outside of the motor; and wherein provision is made for the outward longitudinal movement of the bushing to take care of any expansion that may occur due to heat, and thus eliminate the possibility of the bushing becoming distorted thereby.

Having thus briefly stated some of the major objects and advantages of the invention I will now proceed to describe it in detail with the aid of the accompanying drawings, in which.

Figure 1:
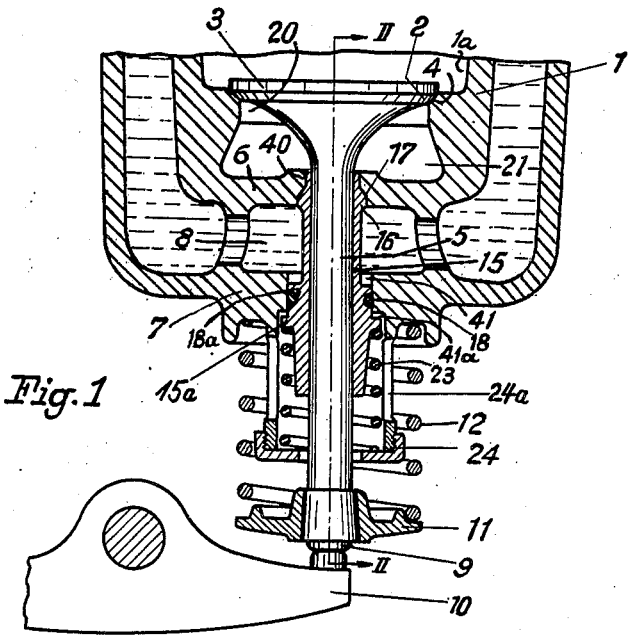
Figure 1 illustrates a sectional view on the line I—I of Figure 2 showing a portion of a cylinder and my valve guide arrangement.
Figure 2:
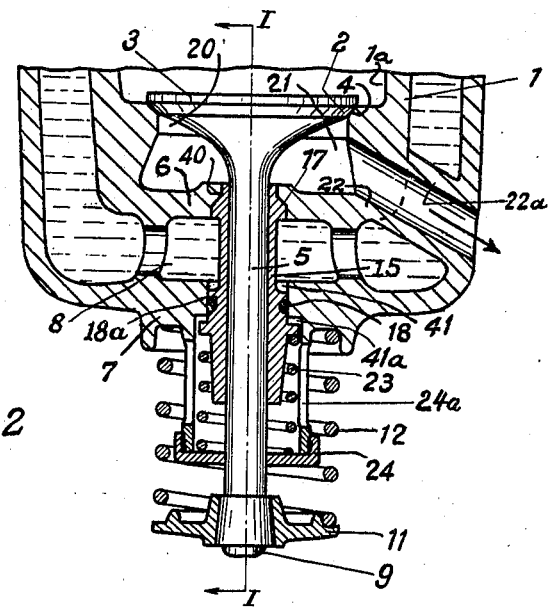
Figure 2 is a section on the line II—II of Figure 1.

Referring first to Figures 1 and 2 of the drawings, 1 designates a cylinder having an inner wall 6 which encloses a combustion chamber 1a and a valve recess 21 which are connected to one another through a valve opening 20 having an annular seat 4 around it. Formed integral with the inner wall 6 and suitably spaced therefrom is a cooling chamber wall 7 between which and the said inner wall a cooling chamber 8 is provided. Formed through the inner wall 6 and extending from the valve recess 21 to the cooling chamber 8 is an aperture 40, the bore of which is smaller adjacent the said recess and larger adjacent the said cooling chamber, and which, intermediately of its length, is provided with an outwardly enlarged tapered annular seat 17. Formed through the cooling chamber wall 7 is an aperture 41 coaxial with the aperture 40 and larger in diameter than the latter. This aperture 41 is smaller at its inner extremity and is counterbored from its outer extremity to form an annular step 41a intermediately of its length.

Mounted in the apertures 40 and 41 and extending through the cooling chamber 8 is a bushing 15 having an integral annular projection 16 the inner extremity of which is downwardly and outwardly tapered to bear against the seat 17 and prevent the passage of water from the cooling chamber into the valve recess 21. Around the bushing 15 an annular groove 18a is also formed to receive a packing ring 18, of suitable material such as rubber, to form a tight joint in the aperture 41 between the cooling chamber 8 and the outside of the cylinder, and at the same time to permit any slight outward movement of the bushing through the said aperture that may occur due to expansion.

3 denotes a valve the annular margin of which normally rests upon the seat 4, and extending from the said valve is a stem 5 which projects through the bushing 15 and is adapted at its outer extremity to be contacted by a tappet 10 by which the valve is intermittently raised off its seat in the conventional manner. A disc 11 is secured around the stem 5 adjacent its outer extremity and extending between the said disc and the adjacent face of the cylinder is a spring 12 by which the stem is normally retained in its outward position and the valve 3 upon its seat 4. It is to be noted that the valve stem 5 tapers into valve 3, such taper extending substantially from inner cylinder wall 6 when the valve is seated. It will therefore be seen that the valve guide or bushing 15 is so proportioned and arranged with reference to the cooling chamber, stem, and the taper into the valve proper that the guide extends along the stem to substantially the beginning of the taper when the valve is seated and that the cooling medium therefore is positioned as close to the beginning of the taper as possible.

Extending from the outside of the cylinder 1 and preferably integral therewith is a tubular projection 24a which is coaxial with the valve stem 5 and has an apertured cap 24 mounted upon its outer extremity through which the stem 5 projects. Extending between the cap 24 and the flange 15a of the bushing 15 is a helical spring 23 which forces the bushing inwardly and retains the annular projection 16 on the bushing in engagement with the seat 17.

It will also be noted that a port 22 is formed through the inner wall 6 and the cooling chamber wall 7 and also through a tubular connection 22a which is integral with both the parts 6 and 7, and has its periphery directly exposed to the cooling medium in the cooling chamber 8.

Figure 3:
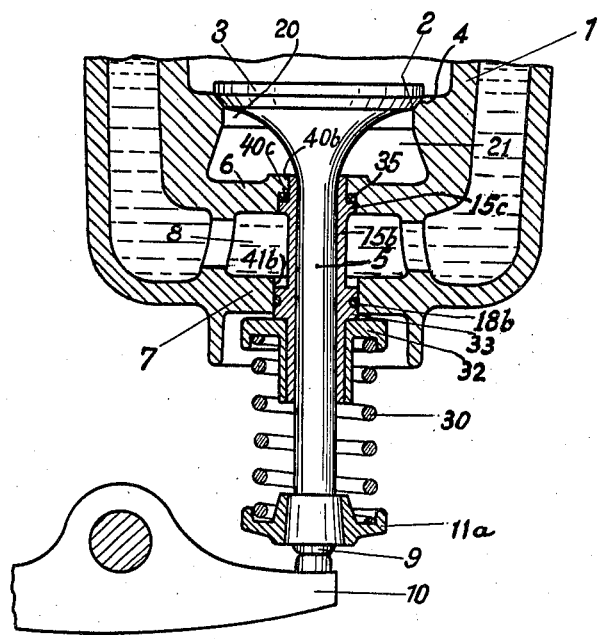
Figure 3 is a modified sectional view showing a slightly varied construction.

Referring now to the construction shown in Figure 3. In this case the arrangement is the same so far as the following parts are concerned: To wit the cylinder 1 with its inner wall 6, cooling chamber 8, cooling chamber wall 7, valve recess 21, valve opening 20, and seat 4 to receive the annular margin 2 of the valve 3 from which the stem 5 projects and against the outer extremity 9 of which the tappet 10 operates.

However in this instance the aperture 40b, which receives the bushing 15b, is of somewhat different form in that it is counterbored from the water cooling chamber 8 to provide a flat seat 40c to receive a packing washer 35 against which a flat annular flange 15c on the said bushing 15b rests. The aperture 41b is also somewhat different in that its bore is of uniform diameter throughout its length, though the outward escape of the cooling medium in the cooling chamber 8 is again prevented by a similarly mounted packing ring 18b carried in this instance around the periphery of a flange 33 integral with the said bushing 15b.

A flange 32 is mounted around the lower extremity of the bushing 15b and bears against the underside of the flange 33. Extending between the disc 11a secured around the valve stem 5 adjacent its outer extremity and the flange 33 is a helical spring 30 which performs a dual function. It both forces the annular flange 15c and the washer 35 into firm engagement with the seat 40c to prevent leakage from the cooling chamber 8 into the valve recess 21, and also tends to retain the valve stem 5 in its outward position and thus the valve 3 upon its seat 4.

In both forms of construction it will be noted that the bushing 15, or 15b, is so formed that the portion thereof which extends through the water cooling chamber 8 is as thin as possible in order to maintain the temperature of the stem as low as possible. Moreover, as previously stated, the bushing should be made of material of high heat conductivity, such as bronze.

What I claim is:

1. In an internal combustion engine cylinder the combination of a valve seat, a valve, a reciprocating stem connected to the valve, a cooling chamber surrounding a portion of said stem, a valve guide extending through said cooling chamber slidably receiving the stem and positioned by the walls of said chamber for movement with reference thereto axially of the stem, cooperating means on said guide and that wall of said chamber adjacent the valve limiting movement of the guide toward the valve, and yieldable means urging said guide toward said limit of movement.

2. In an internal combustion engine cylinder the combination of a valve seat, a valve, a reciprocating stem connected to the valve, a cooling chamber surrounding a portion of said stem, a valve guide extending through said cooling chamber slidably receiving the stem and positioned by the walls of said chamber for movement with reference thereto axially of the stem, cooperating tapered surfaces on said guide and that wall of said chamber adjacent the valve limiting movement of the guide toward the valve, and yieldable means urging said guide toward said limit of movement.

3. In an internal combustion engine cylinder the combination of a valve seat, a valve chamber immediately below said seat, a valve, a reciprocating stem tapered into said valve, said taper extending substantially from the wall of said chamber when the valve is seated, a cooling chamber immediately below said first-mentioned chamber and having one wall in common therewith, said cooling chamber surrounding a portion of said stem, a valve guide extending through said cooling chamber slidably receiving the stem and positioned by the walls of said cooling chamber for movement with reference thereto axially of the stem, said guide, stem, and taper being so proportioned and arranged that the guide extends along the stem to substantially the beginning of the taper when the valve is seated, cooperating means on said guide and the wall common to said cooling chamber and said valve chamber limiting movement of the guide toward the valve, and yieldable means urging said guide toward said limit of movement.

4. In an internal combustion engine cylinder the combination of a valve seat, a valve, a reciprocating stem connected to the valve, a cooling chamber surrounding a portion of said stem, a valve guide sleeve extending through said cooling chamber slidably receiving the stem and positioned by the walls of said chamber for movement with reference thereto axially of the stem, said guide sleeve being of substantially less thickness where it passes through the cooling chamber than elsewhere, cooperating means on said guide and that wall of said chamber adjacent the valve limiting movement of the guide toward the valve, and yieldable means urging said guide toward said limit of movement.

5. In an internal combustion engine cylinder the combination of a valve seat, a valve chamber immediately below said seat, a valve, a reciprocating stem tapered into said valve, said taper extending substantially from the wall of said chamber when the valve is seated, a cooling chamber immediately below said first-mentioned chamber and having one wall in common therewith, said cooling chamber surrounding a portion of said stem, a valve guide extending through said cooling chamber slidably receiving the stem and positioned by the walls of said cooling chamber for movement with reference thereto axially of the stem, cooperating means on said guide and the wall common to said cooling chamber and said valve chamber limiting movement of the guide toward the valve, and yieldable means urging said guide toward said limit of movement.

ALFRED SCHEIBE.